United States Patent Office 3,641,046
Patented Feb. 8, 1972

3,641,046
DERIVATIVES OF THIOURAZOLES
John W. Gates, Jr., Albert W. Wise, Dorothy J. Beavers, and Paul E. Miller, Rochester, N.Y., assignors to Eastman Kodak Company, Rochester, N.Y.
No Drawing. Filed Apr. 4, 1969, Ser. No. 813,715
Int. Cl. C07d 55/06, 93/08
U.S. Cl. 260—308 R
14 Claims

ABSTRACT OF THE DISCLOSURE

This invention relates to thiourazole adducts formed by reacting an α,β-unsaturated compound with a thiourazole. In one aspect, this invention relates to mono- and di-adducts of thiourazoles and dithiourazoles. In another aspect, this invention relates to thiourazole adducts which have been further reacted through the functional groups on the adduct.

---

This invention relates to new organic compounds. In one aspect, this invention relates to derivatives of thiourazole compounds. In another aspect, this invention relates to a process for making derivatives of thiourazole compounds.

It is known in the art to make monothiourazole and dithiourazole compounds.

We have now found that by reacting monothiourazole and dithiourazole compounds with α,β-unsaturated compounds, very useful compounds can be provided.

In one preferred embodiment, a thiourazole is reacted with an α,β-unsaturated organic aldehyde.

In another preferred embodiment, a thiourazole is reacted with an α,β-unsaturated acid, ester, amide or ketone.

In another preferred embodiment, a dithiourazole is reacted with an α,β-unsaturated ketone or aldehyde or a combination to produce a di-adduct of said dithiourazole.

In still another preferred embodiment, the adduct or diadduct of said dithiourazoles which contain free ketone or aldehyde groups are further reacted with hydrazines, hydroxylamine, thiosemicarbazides, semicarbazides and the like to produce additional useful compounds. It is understood that compounds of this type are within the scope of this invention.

Generally, the processes of this invention involve the reaction of an α,β-unsaturated compound with a thiourazole of the following formula or a tautomer thereof:

$$\begin{array}{c} HN\text{------}NH \\ |\qquad\quad| \\ C\qquad\; C \\ \diagup\!\!=\quad\diagdown\!\!= \\ X\qquad N\qquad S \\ \qquad| \\ \qquad R \end{array}$$

wherein X is an oxygen atom, sulfur atom or imino group and R is a hydrogen atom or an alkyl group having from 1–8 carbon atoms such as methyl, ethyl, propyl, isopropyl, butyl, isobutyl and the like, or an aryl group such as a phenyl group and the like. The α,β-unsaturated organic compounds preferably have the formula:

$$\begin{array}{c} R^1\;\; R^2\;\; O \\ |\quad\; |\quad\; \| \\ HC=C-C-R^3 \end{array}$$

wherein $R^1$, $R^2$ can be a hydrogen atom or an alkyl group containing from about 1 to 4 carbon atoms, $R^3$ can be a hydrogen atom, an hydroxyl group, an amine group, an alkyl ether group or an alkyl group containing from 1–10 carbon atoms.

In one embodiment where R is a hydrogen atom and an α,β-unsaturated organic aldehyde is reacted with a thiourazole, it is believed that the reaction product is bicyclic and represented by the formula or a tautomer thereof:

$$\begin{array}{c} N\text{------}NH \\ \|\qquad\quad| \\ C\qquad\; C=X \\ \diagup\quad\diagdown\quad\diagup \\ S\qquad N \\ |\qquad\quad| \\ R^1\!-\!CH\quad\; C\!-\!OH \\ \diagdown_H\!\diagup\;\;\diagdown \\ C\qquad R^6 \\ | \\ R^2 \end{array}$$

wherein X is an oxygen atom, sulfur atom, or imino group, and $R^1$ and $R^2$ are as represented above and $R^6$ can be a hydrogen atom or an alkyl group containing from 1–10 carbon atoms.

In another embodiment where an α,β-unsaturated acid, ester, amide or ketone is reacted with a thiourazole, the reaction product is believed to be as follows or a tautomer thereof:

$$\begin{array}{c} HN\text{------}N\qquad\; R^1\;\; R^2\;\; O \\ |\qquad\quad\|\qquad\quad\;\;|\quad\; |\quad\; \| \\ X=C\qquad C-S-C-C-R^3 \\ \diagdown\quad\diagup\qquad\quad\;\;H\;\; H \\ N \\ | \\ R \end{array}$$

wherein R, $R^1$, $R^2$, $R^3$ and X are as described above. Where a dithiourazole with an R represented by a hydrogen atom is reacted with the α,β-unsaturated aldehyde or ketone, it is believed that a bicyclic compound is formed when 2 molar equivalents of the α,β-unsaturated compound are used. The reaction product is believed to be as follows:

$$\begin{array}{c} N\text{------}N\qquad\qquad R^4\;\; R^5 \\ \|\qquad\quad\|\qquad\qquad|\quad\; | \\ C\qquad\; C-S-C-C-OR^7 \\ \diagup\quad\diagdown\quad\diagup\qquad\;\;H\;\;H\;\;\| \\ S\qquad N\qquad\qquad\qquad\;\; C- \\ |\qquad\quad| \\ R^1\!-\!CH\quad\; C\!-\!OH \\ \diagdown_H\!\diagup\;\;\diagdown \\ R^2\!-\!C\qquad R^6 \end{array}$$

wherein $R^1$, $R^2$, $R^4$, $R^5$ and $R^6$ are as described above and $R^7$ is an alkyl group having from 1–10 carbon atoms, a hydroxyl group, an amine group, or an alkyl ether group. It is understood that $R^1$, $R^2$ $R^4$ and $R^5$ can each be different groups from the others.

In still another embodiment, the adducts and diadducts can be further reacted through the remaining functional reactive groups to form improved variations of the adducts and diadducts.

The new compounds of this invention are very useful as additives to photographic compositions as well as other applications such as corrosion inhibitors, fuel additives, antioxidants and plasticizers of polymeric compositions and the like. The new compounds are especially useful in heat-stabilized-print-out silver halide emulsions to improve the image properties in the emulsions; in particular, they can be used in silver halide emulsions containing silver halide grains with polyvalent metal ions occluded on the inside thereof wherein the new compounds provide advantageous improvements in the image record upon processing the emulsion. These new compounds also provide good antifoggants in silver salt photographic emulsions.

The invention can be further illustrated by the following examples of preferred embodiments thereof, although it will be understood that the examples are included merely for purposes of illustration and are not intended to limit the scope of the invention unless otherwise indicated.

EXAMPLE 1

3-[β-carboxyethylthio]-1,2,4-triazoline-5-thione

To a stirring suspension of 6.65 gms. of 1,2,4-triazolidine-3,5-dithione in 50 ml. of water is added 3.6 gms. of acrylic acid. Within 15 minutes at room temperature the solids dissolve, and after ½ hour of stirring a precipitate forms. Stirring continues for an additional ½ hour and then after chilling the suspension, the precipitate is collected. The crude product (11 gms.) is then recrystallized from dilute alcohol to produce a yield of 84 percent, M.P. 204–5° C.

EXAMPLE 2

3-[α-methyl-β-carboxyethylthio]-1,2,4-triazoline-5-thione

This compound is prepared in a manner similar to that described in Example 1, except that acrylic acid is replaced with crotonic acid to produce a yield of 75 percent, M.P. 196–8° C.

EXAMPLE 3

3-[β-carboxyethylthio]-4-phenyl-1,2,4-triazoline-5-thione

This compound is prepared in a manner similar to that described in Example 1, except that 1,2,4-triazolidine-3,5-dithione is replaced with 1,2,4-triazolidine-4-phenyl-3,5-dithione to produce a yield of 93 percent, M.P. 175–6° C.

EXAMPLE 4

3-[β-N,N-dimethylcarboxamidoethylthio]-4-phenyl-1,2,4-triazoline-5-thione

This compound is prepared in a manner similar to that described in Example 1, except that 1,2,4-triazolidine-3,5-dithione is replaced with 1,2,4-triazolidine-4-phenyl-3,5-dithione and acrylic acid is replaced with N,N-dimethylacrylamide to produce a yield of 82 percent, M.P. 169–71° C.

EXAMPLE 5

3-[β-N,N-dimethylcarboxamidoethylthio]-1,2,4-triazoline-5-thione

This compound is prepared in a manner similar to that described in Example 1, except that acrylic acid is replaced with N,N-dimethylacrylamide to produce a yield of 94 percent, M.P. 190–2° C.

EXAMPLE 6

3-[β-carbobutoxyethylthio]-1,2,4-triazoline-5-thione

This compound is prepared in a manner similar to that described in Example 1, except that acrylic acid is replaced with butylacrylate to produce a yield of 78 percent, M.P. 110–112° C.

EXAMPLE 7

3-[β-carboxamidoethylthio]-1,2,4-triazoline-5-thione

This compound is prepared in a manner similar to that described in Example 1, except that acrylic acid is replaced with acrylamide to produce a yield of 82 percent, M.P. 208–210° C.

EXAMPLE 8

3-[β-methyl-β-carboxamidoethylthio]-1,2,4-triazoline-5-thione

This compound is prepared in a manner similar to that described in Example 1, except that acrylic acid is replaced with methylacrylamide to produce a yield of 61 percent, M.P. 202–205° C.

EXAMPLE 9

3-[β-carboxamidoethylthio]-1,2,4-triazoline-5-thione

This compound is prepared in a manner similar to that described in Example 1, except that acrylic acid is replaced with ethylacrylate to produce a yield of 73 percent, M.P. 102–104° C.

EXAMPLE 10

1-phenyl-3,5-dithiourazole

The preparation of this prior art compound is described in "Berichte der Deutscher Chemischer Gesellschaft, 1904, vol. 1, page 184 (37th year).

EXAMPLE 11

Samples of the compounds of Examples 1–10 are added to separate portions of a high-speed silver bromoiodide emulsion that is panchromatically sensitized with a cyanine dye. Each emulsion sample is coated on a cellulose aceate film support at a coverage of 459 mg. of silver and 1040 mg. of gelatin per square foot. A sample of each film coating is then exposed on an Eastman 1B sensitometer, processed for 5 minutes in Kodak DK–50 developer, fixed, washed and dried with the following photographic results.

|  | G./mole | Fresh | | | 2 wk. inc. 120° F. 50% RH | | |
| --- | --- | --- | --- | --- | --- | --- | --- |
|  |  | Rel. speed | γ | Fog | Rel. speed | γ | Fog |
| Control | | 100 | 1.29 | .15 | 34 | 96 | .66 |
| Example No.: | | | | | | | |
| 1 | .09 | 65 | 1.03 | .11 | 43 | .98 | .13 |
| 2 | .09 | 57 | .87 | .09 | 36 | .80 | .10 |
| 3 | .009 | 85 | 1.22 | .12 | 69 | 1.20 | .22 |
| 4 | .09 | 76 | 1.17 | .13 | 58 | 1.10 | .17 |
| 5 | .09 | 67 | 1.15 | .11 | 47 | 1.10 | .15 |
| 6 | .09 | 74 | 1.17 | .12 | 48 | 1.08 | .20 |
| 7 | .09 | 58 | 1.07 | .11 | 34 | .87 | .15 |
| 8 | .09 | 62 | 1.15 | .10 | 49 | 1.20 | .16 |
| 9 | .09 | 55 | 1.20 | .12 | 44 | 1.12 | .19 |
| 10 | .09 | 83 | 1.43 | .14 | 60 | 1.13 | .28 |

It can be readily seen from the above table that the adducts of thiourazoles according to this invention, Examples 1–9, exhibit better results as antifoggants in a photographic emulsion than similar previously known compounds such as 1-phenyl dithiourazole, illustrated in Example 10.

EXAMPLE 12

To a stirred suspension of 53.2 g. (0.4 mole) of dithiourazole in 400 ml. of 1:1 alcohol-water at R.T. is added 28 g. g. (0.4 mole) of crotonaldehyde. The suspension warms up as stirring continues and after approximately 15 minutes a clear solution results. At this point it is advisable to warm the solution to 60–70° C. and filter if necessary. Stirring is continued for 1 hour and then the solution is chilled and the precipitate collected and washed twice with 50 cc. of acid 1:1 alcohol-water on the funnel. After drying at 75° C. in a vacuum oven, the yield of the first crop is 47–49 g., M.P. 190–2° C.

The combined filtrates a yield a second crop of 12–13 g. M.P. 189–191° C. after concentration to approximately ⅔ of the original volume, chilling and seeding with a crystal of the first crop material. Total yield is 59–62 g. (73–77 percent).

The product may be recrystallized from 50 percent alcohol in 90+ percent yield to give material with M.P. 191–2° C.

EXAMPLE 13

A radiation-sensitive gelatin silver bromoiodide photographic emulsion is prepared as described in Example 19 of U.S. application Ser. No. 625,590, now U.S. Pat. 3,447,927, issued June 3, 1969, to Bacon et al. To portions of the emulsion, the halogen acceptors and aldehydes listed below are added. The emulsion samples are coated on a paper support at about 70 mg. Ag/ft.$^2$.

Sample 1—containing dithiourazole hydrazine salt at 20 g./mole and formaldehyde at 15 g./mole Sample 2—containing dithiourazole at 20 grams and crotonaldehyde at 20 grams per mole Sample 3—dithiourazole-crotonaldehyde mono-adduct of Example 12

Samples of each coating are then exposed imagewise through a continuous density wedge for 1 second with a 500-watt lamp and heated on an aluminum block with a Teflon surface for 5 seconds at block temperatures of 210° C. and 235° C. The samples are then photodeveloped for 5 minutes at 12 cm. from two 8-watt ultraviolet lamps.

Separate sets of these processed coatings are then given the following exposures to fluorescent room lights: none (control); 24 hours; 7 days; 14 days. The following results are obtained:

HEAT STABILIZED AT 235° C., EXPOSURE TO FLUORESCENT LIGHT

| Addenda | Control | | 24 Hours | | 7 Days | | 14 Days | |
|---|---|---|---|---|---|---|---|---|
| | $D_{max.}$ | $D_{min.}$ | $D_{max.}$ | $D_{min.}$ | $D_{max.}$ | $D_{min.}$ | $D_{max.}$ | $D_{min.}$ |
| Sample: | | | | | | | | |
| 1 | 1.12 | .20 | 1.22 | .27 | 1.30 | .42 | 1.30 | .42 |
| 2 | 1.00 | .16 | 1.12 | .22 | 1.20 | .41 | 1.21 | .44 |
| 3 | 0.92 | .08 | 1.15 | .10 | 1.28 | .16 | 1.32 | .19 |

EXAMPLE 14

3-(β-acetylethylthio)-1,2,4-triazoline-5-thione is made by adding 6.7 g. of dithiourazole to 3.5 g. of methyl vinyl ketone in 50 cc. of 50% aqueous ethyl alcohol. An immediate reaction occurs which is allowed to proceed with stirring for 1 hour at room temperature. The mixture is allowed to settle and is filtered with a yield of 10 g. It is then crystallized out of ethyl alcohol and dried with a yield of 8.5 g., M.P. 146.8° C. Upon recrystallization it yields an M.P. of 152.4° C.

*Analysis.*—Calculated (percent): C, 35.5; H, 4.4; N, 20.7; S, 31.5. Found (percent): C, 35.8; H, 4.2; N, 20.7; S, 31.2.

EXAMPLE 15

Method A: A suspension of 9.5 g. of adduct of Example 14 and 3.5 g. of acrolein in 100 ml. of 50% ethanol is stirred at room temperature for 18 hours. The solids dissolve after ½ hour and a precipitate begins to appear after 6 hours. The suspension is chilled and the collected precipitate is recrystallized out of ethanol to yield 10.2 g. of product M.P. 126–7° C.

Calcd. for $C_9H_{13}N_3O_2S_2$ (percent): N, 16.2. Found (percent): N, 16.5.

Method B: A suspension of 5.1 g. of mono-adduct of Example 14 in 40 ml. of water-ethanol (2:1) containing 1.5 g. of acrolein is stirred for ½ hour at room temperature. The solids dissolve within ½ hour with evolution of heat and a precipitate forms on cooling. The material is collected and crystallized out of ethanol to yield 5.3 g. of product M.P. 124–6° C. This material is identical by melting point, mixture melting point and IR spectra with that obtained by Method A.

EXAMPLE 16

A suspension of 11.7 g. of monothiourazole and 5.6 g. of acrolein in 50 ml. of 50% ethanol is stirred at room temperature. After 1 hour, the solids dissolve; stirring is continued for 2 hours. At the end of this time the solution is chilled to yield 15 g. of product. Recrystallization from 50% ethanol yields 10 g. of material with M.P. 209–210° C.

Calcd. for $C_5H_7N_3O_2S$ (percent): N, 24.3. Found (percent): N, 24.5.

EXAMPLE 17

A solution of 3.0 g. of monothiourazole and 1.8 g. of crotonaldehyde in 20 ml. of 50% ethanol is stirred 2 hours at room temperature and then chilled. The precipitate (3.3 g.) is crystallized out of ethanol to yield product M.P. 217–8° C.

Calcd. for $C_6H_9N_3O_2S$ (percent): C, 38.7; H, 4.8; N, 24.8; S, 16.1. Found (percent): C, 38.3; H, 5.2; N, 24.5; S, 16.5.

EXAMPLE 18

When dithiourazole is allowed to react with 2 moles of methyl vinyl ketone in water, well-cooled with ice, an almost quantitative yield of the mono-adduct precipitates within a short time. This precipitate (M.P. 152–4° C.), when allowed to react in water for an additional 18 hours at room temperature with stirring, gradually dissolves a new compound, the diadduct (M.P. 82–4° C.) precipitated in high yields on cooling.

EXAMPLE 19

A radiation-sensitive gelatin silver bromoiodide photographic emulsion is prepared as described in Example 19 of U.S. application Ser. No. 625,590, now U.S. Pat. 3,447,927, issued June 3, 1969, to Bacon et al. To portions of the emulsion, the dithiourazole adducts listed below and a spectral sensitizing dye at a concentration of 150 g./Ag mole are added. The emulsion samples are coated on a paper support at about 70 mg. Ag/ft.[2]. Samples of each coating are then exposed, heated at 250° C. for 5 minutes on a Teflon surface and photodeveloped with the following results.

| | G./mole of Ag | Photographic results | |
|---|---|---|---|
| | | $D_{max.}$ | $D_{min.}$ |
| Adduct: | | | |
| A | 15 | .86 | .16 |
| B | 15 | .70 | .12 |
| C | 34 | 1.30 | .05 |
| D | 15 | 1.20 | .14 |
| E | 15 | 1.12 | .08 |
| F | 34 | 1.04 | .07 |
| G | 34 | 1.16 | .04 |
| H | 34 | 1.13 | .04 |
| I | 46 | 1.09 | .04 |

(A) 3-[β-carboxamido-β-methylethylthio]-1,2,4-triazoline-5-thione
(B) 3-[β-carbobutoxyethylthio]-1,2,4-triazoline-5-thione
(C) 3-(β-acetylethylthio)-1,2,4-triazoline-5-thione
(D) 6,7-dihydro-5-hydroxy-s-triazolo[2,4-b][1,3]-thiazine-3-[2H,5H]thione
(E) 3-(carbethoxyethylthio)-1,2,4-triazoline-5-thione
(F) 3-[β-carboxyethylthio]-1,2,4-triazoline-5-thione
(G) 3-(β-acetylethylthio)-6,7-dihydro-5-hydroxy-5-methyl-[5H]-s-triazolo[3,4-b][1,3]-thiazine
(H) 3-[β-carboxyethylthio]-4-hydroxy-1,2,3a-triaza-7-thia-4,5,6-trihydroindene
(I) 3-[β-acetylethylthio]-4-hydroxy-6-methyl-1,2,3a-triaza-7-thia-4,5,6-trihydroindene

EXAMPLE 20

The oxime of 3-γ-ketobutylthio-1,2,4-triazoline-5-thione is prepared by dissolving 10.15 g. of the adduct prepared by the procedure of Example 14 in 100 cc. of 50% aqueous ethyl alcohol. 3.5 g. of hydroxyl amine hydrochloride and 4.1 g. of anhydrous sodium acetate in 50 cc. of water are added and mixed. Reaction commences immediately, after which the product is settled, chilled and collected. Yield is 10 g., M.P. 194.5° C.

Analysis for $C_6H_{10}ON_4S_2$.—Calcd. (percent): N, 25.7. Found (percent): N, 25.7.

EXAMPLE 21

10.15 g. of the adduct prepared according to Example 14 are dissolved in 50 cc. of 50% aqueous ethyl alcohol.

5.25 g. of 4-methyl-3-thiosemicarbazide in 50 cc. of 50% aqueous ethyl alcohol are added. After reaction, the product is settled, chilled and filtered with a yield of 15 g. at M.P. of 187.9° C.

Analysis for $C_8H_{14}N_6S_3$.—Calcd. (percent): N, 29.0. Found (percent): N, 28.6.

EXAMPLE 22

10.1 g. of the adduct prepared according to Example 14 are dissolved in 100 cc. of 50% ethyl alcohol and reacted with phenyl hydrazine at boiling temperature for ¼ hour. The precipitate yields 8 g. of product with M.P. of 155° C.

Analysis for $C_{12}H_{15}N_5S_2$.—Calcd. (percent): N, 23.9. Found (percent): N, 23.7.

EXAMPLE 23

The dithiourazole adducts which are reacted further through the functional groups are also useful in photographic systems. The following triazoline derivatives are added to a photographic system similar to that described in Example 11 with the following antifoggant and stabilization results.

|  | Compound | (G./mole) | Fresh | | | 2 wk. inc. 120° F./50% RH | | |
|---|---|---|---|---|---|---|---|---|
|  |  |  | Relative speed | γ | Fog | Relative speed | γ | Fog |
| Control |  |  | 100 | 1.41 | .16 | 35.5 | .99 | .72 |
| Example number: |  |  |  |  |  |  |  |  |
| 1 | A | .09 | 82 | 1.17 | .11 | 71 | 1.18 | .29 |
| 2 | B | .09 | 71 | 1.27 | .10 | 62 | 1.17 | .34 |
| 3 | C | .009 | 85 | 1.38 | .11 | 74 | 1.30 | .15 |
| 4 | D | 3.0 | 91 | 1.72 | .11 | 59 | 1.15 | .17 |
| 5 | E | .06 | 118 | 1.55 | .10 | 62 | 1.20 | .27 |
| 6 | F | .03 | 120 | 1.68 | .10 | 67 | 1.30 | .18 |
| 7 | G | .12 | 102 | 1.45 | .15 | 24 | .83 | .26 |
| 8 | H | .15 | 95 | 1.48 | .12 | 52 | 1.00 | .25 |
| 9 | I | .75 | 91 | 1.43 | .11 | 73 | 1.03 | .15 |
| 10 | J | .15 | 74 | 1.40 | .14 | 71 | 1.25 | .22 |
| 11 | K | .15 | 71 | 1.25 | .12 | 80 | 1.22 | .19 |
| 12 | L | .75 | 53 | 1.10 | .14 | 33 | .88 | .17 |
| 13 | M | .09 | 60 | 1.43 | .13 | 52 | 1.13 | .15 |

(A) Oxime of 3-γ-ketobutylthio-1,2,4-triazoline-5-thione
(B) Semicarbazone of 3-γ-ketobutylthio-1,2,4-triazoline-5-thione
(C) Phenylhydrazone of 3-[γ-ketobutylthio]-1,2,4-triazoline-5-thione
(D) 3-(β-carboxyethylthio)-4-methyl-1,2,4-triazoline-5-one
(E) 3-(γ-ketobutylthio)-4-methyl-1,2,4-triazoline-5-one
(F) 3-(γ-ketobutylthio)-4-methyl-1,2,4-triazoline-5-thione
(G) 4-hydroxy-4,5,6,7-tetrahydro-7-thia-1,2,3a-triazaindene-3-thion
(H) 6,7-dihydro-5-hydroxy-3-(γ-ketobutylthio)-7-methyl-[5H]-s-triazolo[3,4-b][1,3]thiazine
(I) 3-(β-acetylethylthio)-6,7-dihydro-5-hydroxy-6-methyl [5H]-s-triazolo-[3,4-b][1,3]-thiazine
(J) 3-(carbethoxyethylthio)-6,7-dihydro-5-hydroxy-5-methyl-[5H]-s-triazolo[3,4-b][1,3]-thiazine
(K) 3-(carbethoxyethylthio)-6,7-dihydro-5-hydroxy-[5H]-s-triazolo-[3,4-b] [1,3]-thiazine
(L) 3-(γ-ketobutylthio)-5-oxo-1,2,4-triazolidine
(M) 3-(α-methyl-β-carbethoxyethylthio)-1,2,4-triazoline-5-thione Although the invention has been described in considerable detail with particular reference to certain preferred embodiments thereof, variations and modifications can be effected within the spirit and scope of the invention.

We claim:
1. An adduct of a thiourazole compound of the following formula or a tautomer thereof:

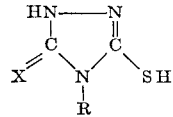

wherein X can be an oxygen atom, sulfur atom, or an imino group, and R is a hydrogen atom, an alkyl group having from 1–8 carbon atoms, or a phenyl group; with an α,β-unsaturated organic compound having the formula:

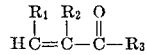

wherein $R^1$ and $R^2$ can be a hydrogen atom or an alkyl group containing from 1–4 carbon atoms, and $R^3$ can be a hydrogen atom, a hydroxyl group, an amine group, an alkyl ether group having from 1–10 carbon atoms, or an alkyl group having from 1–10 carbon atoms.

2. An adduct according to claim 1 wherein R is a hydrogen atom.

3. An adduct according to claim 1 wherein X is a sulfur atom.

4. A diadduct according to claim 1 wherein X is a sulfur atom and R is a hydrogen atom.

5. An adduct according to claim 1 having the formula or a tautomer thereof:

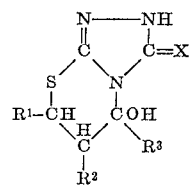

wherein X is an oxygen atom, sulfur atom, or imino group, $R^1$ and $R^2$ can each be a hydrogen atom or an alkyl group having from 1–4 carbon atoms, and $R^3$ can be a hydrogen atom or an alkyl group having from 1–10 carbon atoms.

6. An adduct according to claim 1 having the formula or a tautomer thereof:

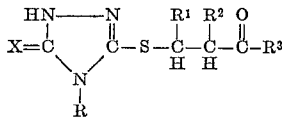

wherein X is an oxygen atom, sulfur atom, or imino group, $R^1$ and $R^2$ can each be a hydrogen atom or an alkyl group having from 1–4 carbon atoms, $R^3$ can be a hydroxyl group, an amine group, an alkyl ether group having from 1–10 carbon atoms, or an alkyl group having from 1–10 carbon atoms, and R is a hydrogen atom, an alkyl group having from 1–8 carbon atoms, or a phenyl group.

7. An adduct according to claim 1 having the formula or a tautomer thereof:

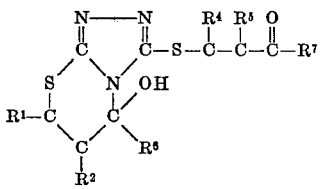

wherein $R^1$, $R^2$, $R^4$, and $R^5$ can each be hydrogen atoms or alkyl groups having from 1–4 carbon atoms, $R^6$ can be a hydrogen atom or an alkyl group having from 1–10 carbon atoms, and $R^7$ can be a hydroxyl group, an amine group, an alkyl ether group having from 1–10 carbon atoms, or an alkyl group having from 1–10 carbon atoms.

8. An adduct according to claim 7 wherein both $R^6$ and $R^7$ are methyl groups.

9. A process comprising reacting a thiourazole having the formula:

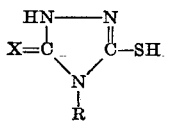

wherein X can be an oxygen atom, sulfur atom, or an imino group, and R is a hydrogen atom, an alkyl group having from 1–8 carbon atoms, or a phenyl group; with an α,β-unsaturated organic compound having the formula:

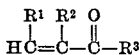

wherein $R^1$ and $R^2$ can be a hydrogen atom or an alkyl group containing from 1–4 carbon atoms, and $R^3$ can be a hydrogen atom, a hydroxyl group, an amine group, an alkyl ether group having from 1–10 carbon atoms, or an alkyl group having from 1–10 carbon atoms, to obtain a mono-adduct or diadduct reaction product.

10. A process according to claim 9 wherein said α,β-unsaturated compound is selected from α,β-unsaturated acids, ketones, amides, and aldehydes having the formula:

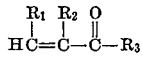

wherein $R^1$ and $R^2$ can be a hydrogen atom or an alkyl group containing from 1–4 carbon atoms, and $R^3$ can be a hydrogen atom, a hydroxyl group, an amine group, an alkyl ether group having from 1–10 carbon atoms, or an alkyl group having from 1–10 carbon atoms.

11. A process according to claim 9 wherein 2 moles of said α,β-unsaturated compound are reacted with each mole of a dithiourazole.

12. A process according to claim 9 wherein the adduct is further reacted with a phenyl hydrazine.

13. A process according to claim 9 wherein the adduct is further reacted with a semicarbazide.

14. A process according to claim 9 wherein the adduct is further reacted with a hydroxyl amine hydrochloride.

References Cited

UNITED STATES PATENTS

| | | | |
|---|---|---|---|
| 2,710,296 | 6/1955 | Jones et al. | 260—308 |
| 3,299,051 | 1/1967 | Stein | 260—243 |
| 3,396,017 | 8/1968 | Bacon et al. | 260—308 X |
| 3,447,927 | 6/1969 | Bacon et al. | 260—308 X |

JOHN M. FORD, Primary Examiner

U.S. Cl. X.R.

260—308 C, 243 R; 96—109, 60 R; 252—391, 402; 260—30.2; 44—63

UNITED STATES PATENT OFFICE
CERTIFICATE OF CORRECTION

Patent No. 3,641,046          Dated February 8, 1972

Inventor(s) John W. Gates, Jr., Albert W. Wise, Dorothy J. Beavers and Paul E. Miller It is certified that error appears in the above-identified patent and that said Letters Patent are hereby corrected as shown below:

In Column 2, line 35

"  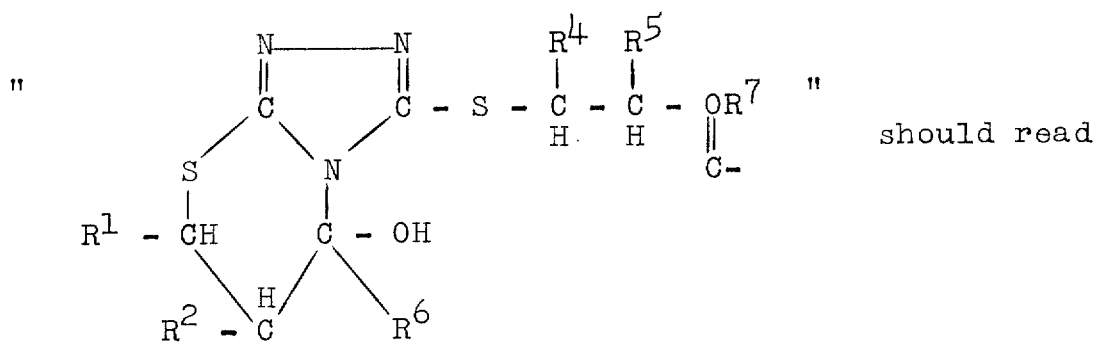  should read

--- 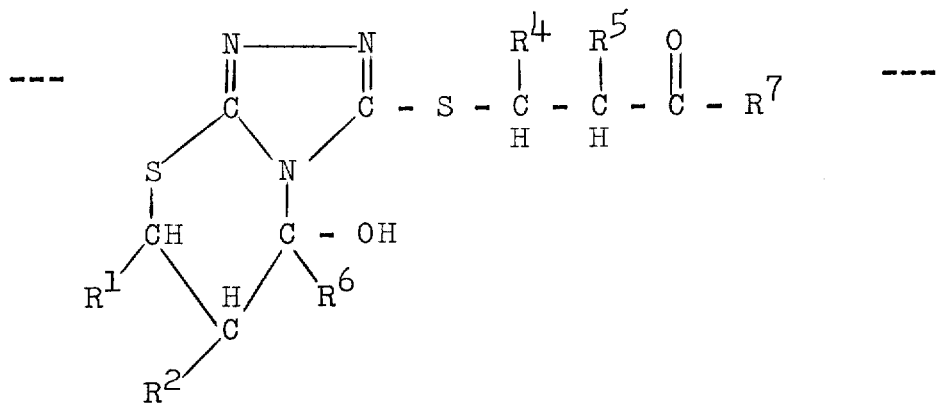 ---

Page 2

PO-1050
(5/69)

UNITED STATES PATENT OFFICE
CERTIFICATE OF CORRECTION

Patent No. 3,641,046                    Dated February 8, 1972

Inventor(s) John W. Gates, Jr., Albert W. Wise, Dorothy J. Beavers and Paul E. Miller It is certified that error appears in the above-identified patent and that said Letters Patent are hereby corrected as shown below:

In Column 2, line 54, "in the emulsions" should read ---in the emulsion---.

In Column 2, line 72, "in50 ml." should read ---in 50 ml.---.

In Column 3, line 70, "$\beta$-carboxamidoethylthio" should read ---$\beta$-carbethoxyethylthio---.

In Column 4, line 44, "28 g. g." should read ---28 g.---.

In Column 6, lines 51-52, "6,7-dihydro-5-hydroxy-s-triazolo[2,4-b][1,3]-thiazine-3-[2H,5H]thione" should read ---6,7-dihydro-5-hydroxy-s-triazolo[3,4-b]-[1,3]-thiazine-3-[2H,5H]thione---.

In Column 7, line 51, "thion" should read ---thione---.

Signed and sealed this 17th day of October 1972.

(SEAL)
Attest:

EDWARD M. FLETCHER, JR.
Attesting Officer

ROBERT GOTTSCHALK
Commissioner of Patents